United States Patent [19]

Kubota et al.

[11] Patent Number: 5,065,259
[45] Date of Patent: Nov. 12, 1991

[54] MAGNETIC RECORDING AND/OR REPRODUCING APPARATUS

[75] Inventors: Yukio Kubota; Keiji Kanota, both of Kanagawa, Japan

[73] Assignee: Sony Corporation, Tokyo, Japan

[21] Appl. No.: 332,788

[22] Filed: Mar. 31, 1989

[30] Foreign Application Priority Data

Apr. 7, 1988 [JP] Japan .................................. 63-85974

[51] Int. Cl.$^5$ ............................. G11B 5/00; G11B 5/01
[52] U.S. Cl. ........................................ 360/32; 360/9.1;
360/19.1; 360/8; 358/335; 358/310
[58] Field of Search .................... 360/9.1, 19.1, 33.1,
360/32, 36; 358/310, 335, 133, 141; 375/122

[56] References Cited

U.S. PATENT DOCUMENTS

| | | | |
|---|---|---|---|
| 4,378,593 | 3/1983 | Yamamoto | 364/900 |
| 4,438,465 | 3/1984 | Moriya et al. | 360/22 X |
| 4,549,227 | 8/1985 | Hashimoto et al. | 358/310 X |
| 4,590,522 | 5/1986 | Takemota et al. | 358/321 |
| 4,608,609 | 8/1986 | Takono et al. | 360/9.1 X |
| 4,633,293 | 12/1986 | Powers | 358/11 |
| 4,763,206 | 8/1988 | Takahashi et al. | 360/19.1 X |
| 4,862,292 | 8/1989 | Enari et al. | 360/33.1 X |

FOREIGN PATENT DOCUMENTS 0114694 8/1984 European Pat. Off. .
0238194 9/1987 European Pat. Off. .
0241227 10/1987 European Pat. Off. .

Primary Examiner—Roy N. Envall, Jr.
Assistant Examiner—Hung H. Bui
Attorney, Agent, or Firm—Philip M. Shaw, Jr.

[57] ABSTRACT

In a system for recording digital data obtained based on an information signal on a magnetic tape and/or reproducing digital data obtained based on an information signal from a magnetic tape, a magnetic recording apparatus comprises an encoder for producing, based on the information signal, one of plural kinds of digital data which have different transmission rates respectively, a time base processor for selectively converting a time base of digital data obtained from the encoder so as to produce modified digital data having a predetermined transmission rate, a recording modulator for producing a recording signal corresponding to the modified digital data, a recording portion provided with a rotary magnetic head device to which the recording signal is supplied and a tape guide for guiding the magnetic tape and operative to cause the rotary magnetic head device to contact with the magnetic tape for forming oblique record tracks on the magnetic tape, a head driver for rotating the rotary magnetic head device at a predetermined speed of rotation, and a tape driving device for causing the magnetic tape to run at a speed corresponding to the transmission rate of the digital data obtained from the encoder.

17 Claims, 3 Drawing Sheets

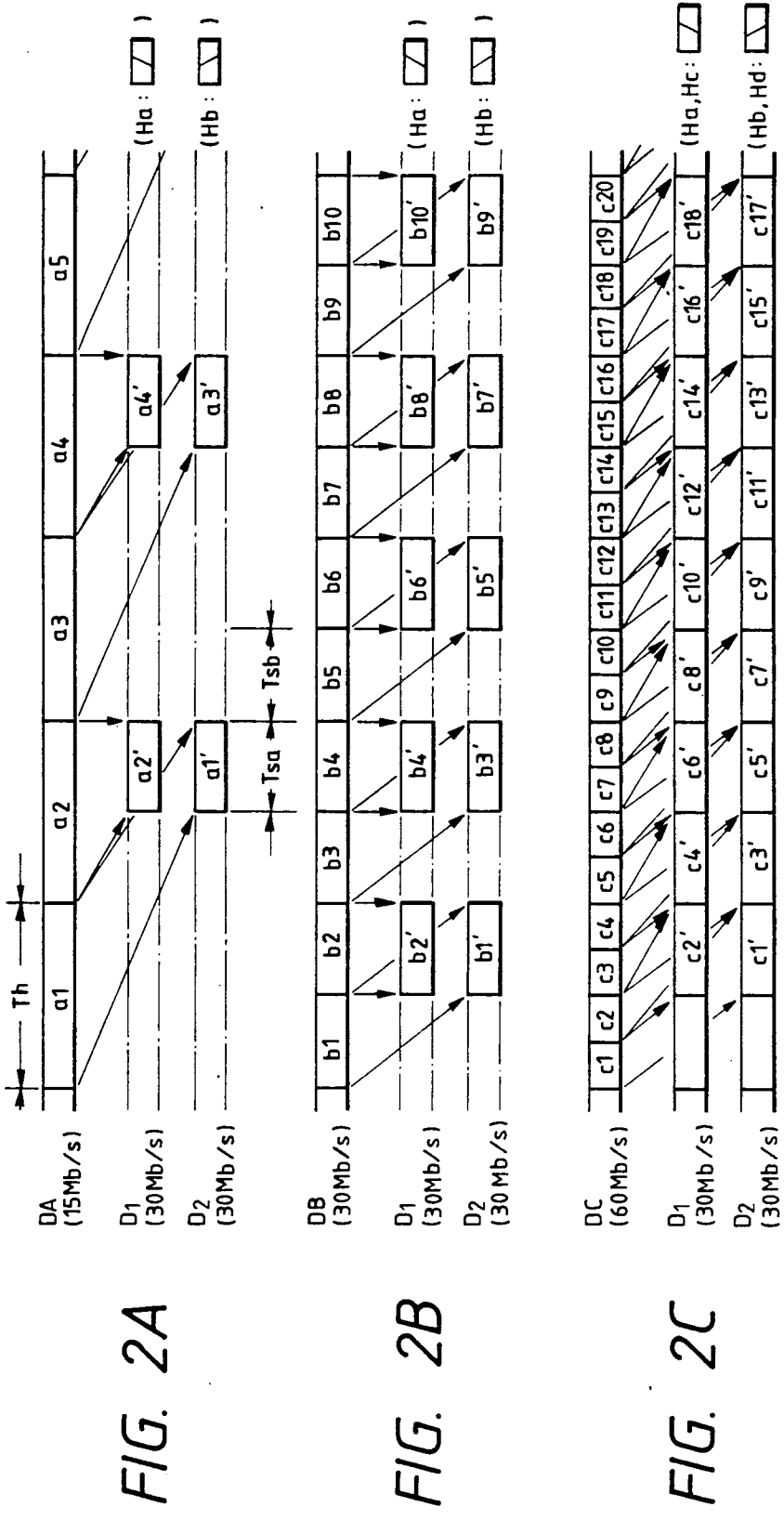

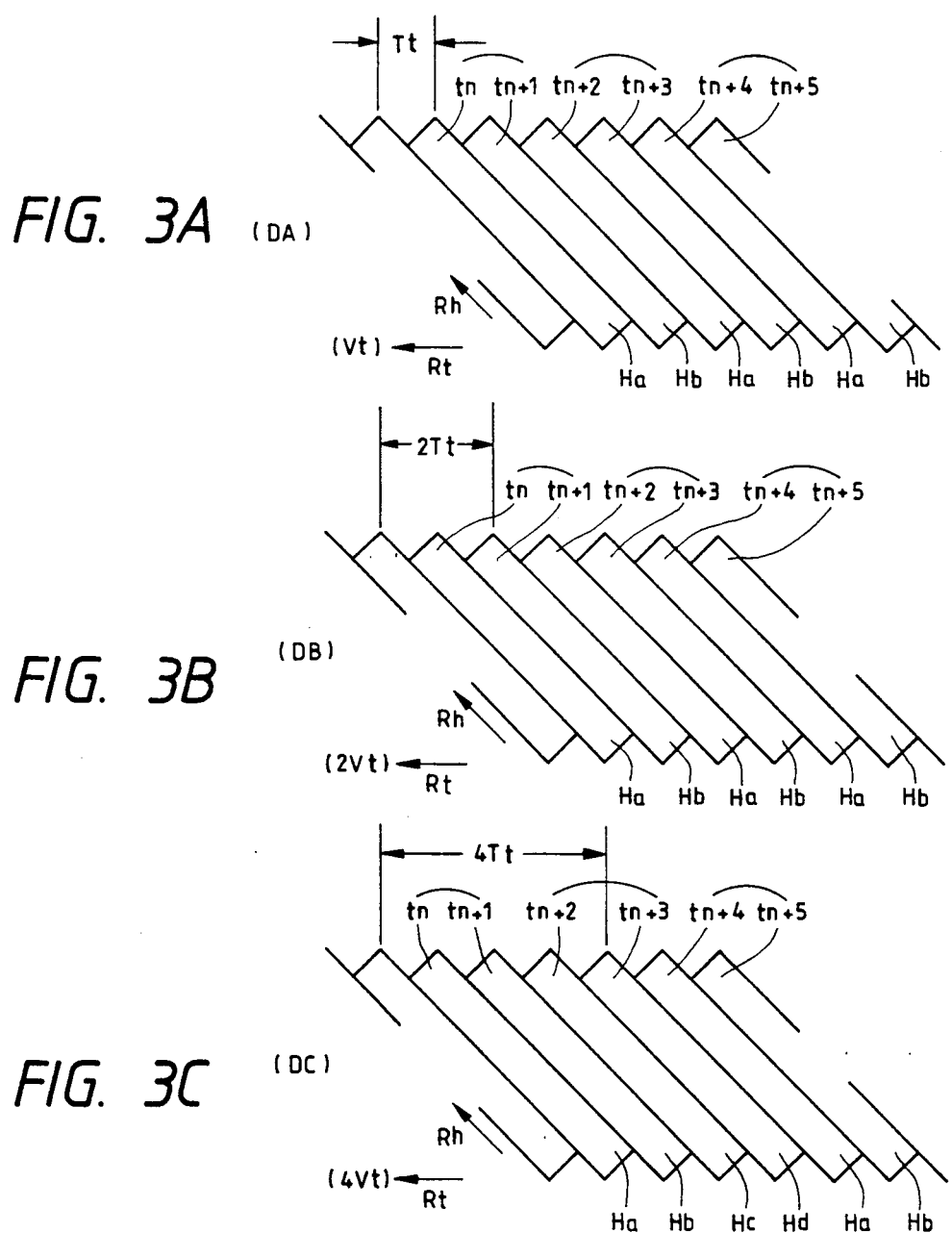
FIG. 3A (DA)
FIG. 3B (DB)
FIG. 3C (DC)

MAGNETIC RECORDING AND/OR REPRODUCING APPARATUS

BACKGROUND OF THE INVENTION

1. Field of the Invention

The present invention relates generally to magnetic recording and/or reproducing apparatus, and more particularly to an apparatus for recording digital data obtained based on an information signal on a magnetic tape by means of a rotary magnetic head device moving to scan the magnetic tape, for reproducing digital data obtained based on an information signal from a magnetic tape, on which the digital data are recorded, by means of a rotary magnetic head device moving to scan the magnetic tape, or for recording digital data obtained based on an information signal on a magnetic tape and reproducing the digital data recorded on the magnetic tape by means of a rotary magnetic head device moving to scan the magnetic tape.

2. Description of the Prior Art

In the field of a video tape recorder (referred to a VTR, hereinafter) used for recording an information signal, such as a color video signal, on a magnetic tape or for reproducing an information signal from a magnetic tape on which the information signal is recorded, there has been proposed to digitalize various signal processing circuits employed in the VTR for the purpose of improving reliability in operation, reducing power consumption, and miniaturizing and lightening the whole body, and a so-called digital VTR, in which an information signal such as a color video signal is converted to digital data to be recorded on a magnetic tape and the digital data obtained base on the information signal are reproduced from the magnetic tape to be converted to a reproduced information signal, has been put to practical use.

In the case of recording and/or reproducing the color video signal by means of the digital VTR, several recording and/or reproducing operation modes are selectively taken as the need arises. For example, when the color video signal subjected to the recording and/or reproduction is a color televising signal according to the NTSC system, PAL system or SECAM system in usual, a LP operation mode in which the color video signal is converted to digital data having the transmission rate of, for example, 15Mb/s to be recorded on the magnetic tape and the digital data having the transmission rate of 15Mb/s obtained based on the color video signal and recorded on the magnetic tape are reproduced from the magnetic tape, and a SP operation mode in which the color video signal is converted to digital data having the transmission rate of, for example, 30Mb/s to be recorded on the magnetic tape and the digital data having the transmission rate of 30Mb/s obtained based on the color video signal and recorded on the magnetic tape are reproduced from the magnetic tape, are selectively taken respectively for achieving a long-playing record on the magnetic tape and for obtaining high quality reproduced pictures based on the reproduced digital data. Further, when a color television signal according to the high definition television system (HDTV system) in which a signal frequency band is extended by a large margin and a horizontal frequency is raised by a large margin in comparison with the color television signal according to the NTSC system is subjected to the recording and/or reproduction, a HD operation mode in which the color video signal is converted to digital data having the transmission rate of, for example, 60Mb/s in view of the extended signal frequency band thereof to be recorded on the magnetic tape and the digital data having the transmission rate of 60Mb/s obtained based on the color video signal and recorded on the magnetic tape are reproduced from the magnetic tape, is taken.

It would be a great convenience to use a VTR in which the LP operation mode, SP operation mode and HD operation mode can be selected appropriately for recording digital date obtained from a color video signal on a magnetic tape and reproducing the digital data from the magnetic tape. However, it seems that such a VTR in which the LP operation mode, SP operation mode and HD operation mode can be selected appropriately has not been proposed previously.

In the case where it is considered to modify a VTR having a pair of rotary magnetic heads disposed at angular intervals of 180 degrees therebetween for scanning alternately a magnetic tape to form oblique record tracks thereon, which has come into wide use at present, so as to be operative to work in each of the LP, SP and HD operation modes selected as occasion demands, the modified VTR is required to be provided with a head driving mechanism for rotating the magnetic rotary heads at each of different three speeds corresponding respectively to the transmission rates of the digital data treated in the LP, SP and HD operation modes, which includes a high speed rotation device for rotating the rotary magnetic heads at an extremely high speed when the HD operation mode is taken, a tape guide mechanism for guiding the magnetic tape along each of different three running paths which are to be made respectively in the LP, SP and HD operation modes, and three digital data processing circuit arrangements for dealing with the digital data in the LP, SP and HD operation modes, respectively. This results in a disadvantage that the modified VTR is very complicated in its construction. Further, in such a modified VTR as mentioned above, it is considerably difficult to keep each of various mechanisms operating with sufficient reliability and the production cost is undesirably increased due to the high speed rotating device.

OBJECTS AND SUMMARY OF THE INVENTION

Accordingly, it is an object of the present invention to provide a magnetic recording and/or reproducing apparatus for recording digital data obtained based on an information signal on a magnetic tape, for reproducing digital data obtained based on an information signal from a magnetic tape, or for recording digital data obtained based on an information signal on a magnetic tape and reproducing the digital data from the magnetic tape, which avoids the aforementioned disadvantages and problems encountered with the prior art.

Another object of the present invention is to provide a magnetic recording apparatus for recording digital data obtained based on an information signal on a magnetic tape by means of a rotary magnetic head device, which is operative to work in each of the LP, SP and HD operation modes selected as occasion demands with a relatively simple configuration by which reliability in recording operation can be kept sufficient and obtained at a relatively low cost.

A further object of the present invention is to provide a magnetic reproducing apparatus for reproducing digital data obtained based on an information signal from a magnetic tape, on which the digital data are recorded, by means of a rotary magnetic head device, which is operative to work in each of the LP, SP and HD operation modes selected as occasion demands with a relatively simple configuration by which reliability in reproducing operation can be kept sufficient and obtained at a relatively low cost.

A still further object of the present invention is to provide a magnetic recording and reproducing apparatus for recording digital data obtained based on an information signal on a magnetic tape and reproducing the digital data from the magnetic tape by means of a rotary magnetic head device, which is operative to work in each of the LP, SP and HD operation modes selected as occasion demands with a relatively simple configuration by which reliability in recording or reproducing operation can be kept sufficient and obtained at a relatively low cost.

According to the present invention, there is provided a magnetic recording apparatus comprising an encoder for encoding an information signal to one of plural kinds of digital data which have respective different transmission rates; a time base processor for selectively converting a time base of the digital data obtained from the encoder so as to produce modified digital data having a predetermined transmission rate; a recording modulator for producing a recording signal corresponding to the modified digital data obtained from the time base processor; a recording portion provided with a rotary magnetic head device to which the recording signal obtained from the recording modulator is supplied and a tape guide for guiding a magnetic tape on which the recording signal is to be recorded and operative to cause the rotary magnetic head device to contact with the magnetic tape for forming oblique record tracks on the magnetic tape; a head driver for rotating the rotary magnetic head device at a predetermined speed of rotation; and a tape driving device for causing the magnetic tape to run at a speed corresponding to the transmission rate of the digital data obtained from the encoder.

There is also provided, according to the present invention, a magnetic reproducing apparatus comprising a reproducing portion provided with a rotary magnetic head device and a tape guide for guiding a magnetic tape on which a recording signal obtained based on digital data having a predetermined transmission rate is recorded in each of oblique record tracks and operative to cause the rotary magnetic head device to contact with the magnetic tape for scanning the oblique record tracks; a head driver for rotating the rotary magnetic head device at a predetermined speed of rotation; a tape driving device for causing the magnetic tape to run at a speed selected from a plurality of predetermined speeds satisfying a predetermined relation of ratio; a reproducing demodulator for reproducing the digital data based on the recording signal reproduced by the rotary magnetic head device; a time base processor for causing the digital data obtained from the reproducing demodulator to be subjected to time base conversion so as to produce modified digital data having a predetermined transmission rate selected correspondingly to the selected speed of the magnetic tape; and a decoder for producing, based on the modified digital data obtained from the time base processor, reproduced digital data representing an information signal.

There is further provided, according to the present invention, a magnetic recording and reproducing apparatus comprising a recording and reproducing portion which corresponds to both of the recording portion of the magnetic recording apparatus and the reproducing portion of the magnetic reproducing apparatus mentioned above, and other structural components corresponding to main structural components other than the recording portion of the magnetic recording apparatus and main structural components other than the reproducing portion of the magnetic reproducing apparatus mentioned above.

In the magnetic recording apparatus constituted as described above in accordance with the present invention, the digital data selected from plural kinds of digital data which have the respective different transmission rates are obtained from the encoder. The digital data from the encoder are selectively converted in time base in the time base processor so that the modified digital data having the predetermined transmission rate are obtained, and the modified digital data are supplied to the recording modulator to produce the recording signal. Then, in the recording portion, the recording signal from the recording modulator is recorded in each of the oblique record tracks formed on the magnetic tape, which is transported by the tape driving device at the speed corresponding to the transmission rate of the digital data obtained from the encoder, by the rotary magnetic head device which is rotated by the head driver at the predetermined speed of rotation.

In the magnetic reproducing apparatus constituted as described above in accordance with the present invention, the recording signal is reproduced through the rotary magnetic head device, which is rotated by the head driver at the predetermined speed of rotation, from each of the oblique record tracks formed on the magnetic tape which is transported by the tape driving device at the selected one of the speeds satisfying the predetermined relation of ratio in the reproducing portion. The digital data are obtained based on the recording signal reproduced through the rotary magnetic head device in the reproduced demodulator, and subjected to the time base conversion in the time base processor so that the modified digital data having the predetermined transmission rate which is selected correspondingly to the selected speed of the magnetic tape are obtained. Then, the modified digital data are supplied to the decoder and the reproduced digital data representing the information signal are obtained from the decoder.

Further, in the magnetic recording and reproducing apparatus constituted as described above in accordance with the present invention, recording and reproducing operations are carried out similarly to the recording operation and the reproducing operation performed respectively in the magnetic recording apparatus and the magnetic reproducing apparatus as described above.

With the magnetic recording apparatus, magnetic reproducing apparatus, and magnetic recording and reproducing apparatus according to the present invention, when the recording operation for converting the information signal into one of plural kinds of digital data which have the respective transmission rates different from one another and recording the digital data corresponding to the information signal on the magnetic tape by the rotary magnetic head device or the reproducing operation for obtaining the reproduced digital data through the rotary magnetic head device from the magnetic tape on which the digital data are recorded and reproducing the information signal based on the reproduced digital data is performed, the digital data recorded on the magnetic tape or the reproduced digital data obtained from the magnetic tape are caused to have the predetermined transmission rate, so that the rotary magnetic head device is not required to vary in its speed of rotation. Accordingly, the apparatus according to the present invention can be simplified in configuration and obtained at a relatively low cost with sufficient reliability in the recording or reproducing operation.

In particular, when a color video signal is selected to be the information signal, the apparatus according to the present invention can be operative to work in each of the LP, SP and HD operation modes selected as occasion demands with the relatively simple and cheap configuration which is not provided with a high speed rotating device and by which reliability in the recording or reproducing operation is kept sufficient.

The above, and other objects, features and advantages of the present invention will become apparent from the following detailed description which is to be read in conjunction with the accompanying drawings.

BRIEF DESCRIPTION OF THE DRAWINGS

FIGS. 2A to 2C are time charts used for explaining time base conversion of digital data in the recording and/or reproducing system shown, in FIG. 1; and FIGS. 3A to 3C schematic illustrations showing track patterns formed on a magnetic tape by the recording and/or reproducing system shown in FIG. 1.

DESCRIPTION OF THE PREFERRED EMBODIMENT

Figure 1:
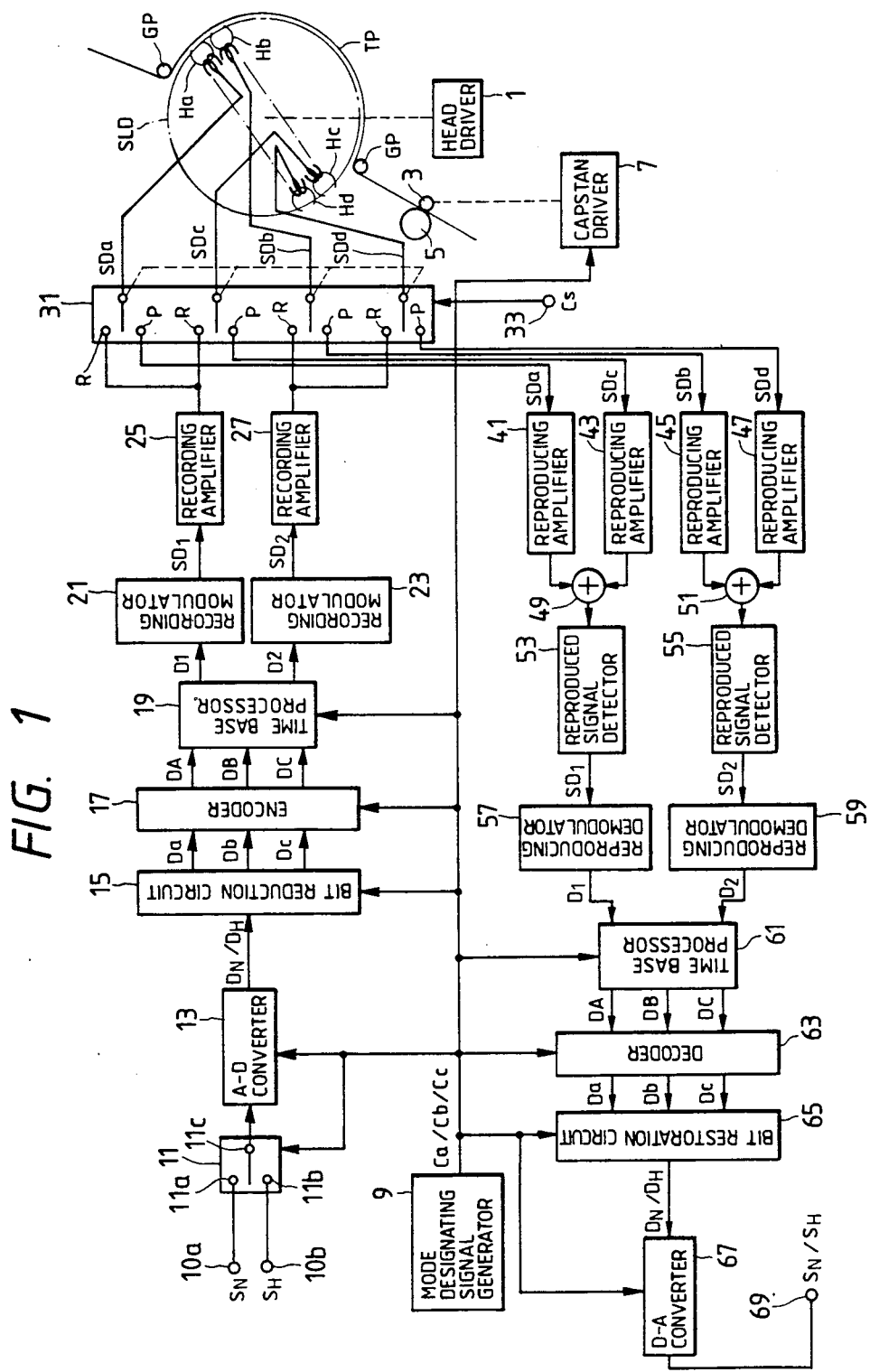
FIG. 1 is a schematic block diagram showing a recording and/or reproducing system including recording and reproducing sections which constitute an embodiment of magnetic recording apparatus, an embodiment of magnetic reproducing apparatus, and an embodiment of magnetic recording and reproducing apparatus each according to the present invention.

FIG. 1 shows a recording and/or reproducing system including recording and reproducing sections by which embodiments of magnetic recording apparatus, magnetic reproducing apparatus, and magnetic recording and reproducing apparatus according to the present invention are constituted.

Referring to FIG. 1, in the recording and/or reproducing system, a color video signal is subjected, as an information signal, to recording on a magnetic tape and reproduction from the magnetic tape in one of the LP, SP and HD operation modes, and a head cylinder SLD in which a pair of rotary magnetic heads Ha and Hb close to each other and another pair of rotary magnetic heads Hc and Hd close to each other are disposed to face each other with the center of the head cylinder SLD is provided in common to the recording and reproducing sections.

The pair of rotary magnetic heads Ha and Hb and the pair of rotary magnetic heads Hc and Hd are driven to rotate at a predetermined constant speed of rotation by a head driver 1. The rotary magnetic heads Ha and Hb are provided with respective different gap angles, and the rotary magnetic heads Hc and Hd are also provided with respective different gap angles.

A magnetic tape TP is wound on the head cylinder SLD with a wrapping angle of about 180 degrees under the guidance by guide pins GP and transported at a predetermined speed by a combination of a capstan 3 which is driven by a capstan driver 7 and a pinch roller 5 facing the capstan 3 with the magnetic tape TP between, so as to be scanned alternately by the pair of rotary magnetic heads Ha and Hb and the pair of rotary magnetic heads Hc and Hd.

A tape guide constituted by the outer surface of the head cylinder SLD and the guide pins GP, and a tape driving device constituted by the capstan 3, pinch roller 5 and capstan driver 7 are provided in common to the recording and reproducing sections. A mode designating signal generator 9 is further provided in common to the recording and reproducing sections.

The mode designating signal generator 9 is operative to supply the recording and reproducing sections with a first mode designating signal Ca for causing the recording and reproducing sections to take the LP operation mode, a second mode designating signal Cb for causing the recording and reproducing sections to take the SP operation mode, and a third mode designating signal Cc for causing the recording and reproducing sections to take the HD operation mode, selectively. The first, second and third mode designating signals Ca,Cb and Cc are selectively supplied also to the capstan driver 7 and the capstan driver 7 is operative to cause the magnetic tape TP to run at the predetermined speed which is one of three different speeds corresponding respectively to the first, second and third mode designating signals Ca, Cb and Cc.

In the recording section of the recording and reproducing system shown in FIG. 1, a color television signal $S_N$ according to the NTSC system is applied to an input terminal 10a or a color television signal $S_H$ according to the HD system is applied to an input terminal 10b. The color television signal $S_N$ or $S_H$ applied to the input terminal 10a or 10b is supplied through a switch 11 to an analog to digital (A-D) converter 13. The switch 11 is supplied selectively with the first, second and third mode designating signals Ca, Cb and Cc and operative to cause a movable contact 11c to be connected to a fixed contact 11a when the first or second mode designating signal Ca or Cb is applied thereto and cause the movable contact 11c to be connected to a fixed contact 11b when the third mode designating signal Cc is applied thereto. Accordingly, in the case where the first mode designating signal Ca is sent out from the mode designating signal generator 9 so that the LP operation mode is taken or the second mode designating signal Cb is sent out from the mode designating signal generator 9 so that the SP operation mode is taken, the color television signal $S_N$ from the input terminal 10a is supplied through the switch 11 to the A-D converter 13, and in the case where the third mode designating signal Cc is sent out from the mode designating signal generator 9 so that the HD operation mode is taken, the color television signal $S_H$ from the input terminal 10b is supplied through the switch 11 to the A-D converter 13.

The A-D converter 13 is supplied selectively with the first, second and third mode designating signals Ca, Cb and Cc and operative to carry out an A-D converting operation in different manners respectively in the case where the first or second mode designating signal Ca or Cb is supplied thereto and in the case where the third mode designating signal Cc is supplied thereto. Consequently, in the LP or SP operation mode, the color television signal $S_N$ is converted to digital data $D_N$ with a first predetermined number of bits by the A-D converter 13, and in the HD operation mode, the color television signal $S_H$ is converted to digital data $D_H$ with a second predetermined number of bits, which is larger than the first predetermined number of bits, by the A-D converter 13.

The digital data $D_N$ or $D_H$ obtained from the A-D converter 13 are supplied to a bit reduction circuit 15. The bit reduction circuit 15 is supplied selectively with the first, second and third mode designating signals Ca, Cb and Cc and operative to cause the digital data $D_N$ or $D_H$ to be subjected to bit reduction in different manners corresponding respectively to the first, second and third mode designating signals Ca, Cb and Cc so as to convert the digital data $D_N$ or $D_H$ to digital data having one of transmission rates which correspond respectively to LP, SP and HD operation mode. With this bit reduction circuit 15, digital data Da having a first transmission rate which is relatively low is obtained based on the digital data $D_N$ in the LP operation mode, digital data Db having a second transmission rate which is higher than the first transmission rate is obtained based on the digital data $D_N$ in the SP operation mode, and digital data Dc having a third transmission rate which is higher than the second transmission rate is obtained based on the digital data $D_H$ in the HD operation mode.

Each of the digital data Da, Db and Dc is supplied to an encoder 17. The encoder 17 is supplied selectively with the first, second and third mode designating signals Ca, Cb and Cc and operative to cause the digital data Da, Db or Dc to be subjected to encoding, in which processes for adding a parity code for error correction to the digital data Da, Db or Dc and for adding a synchronous signal code to the digital data Da, Db or Dc are included, in response to the first, second or third mode designating signal Ca, Cb or Cc, so as to produce encoded digital data. With this encoder 17, encoded digital data DA having a transmission rate of, for example, 15Mb/s are obtained based on the digital data Da in the LP operation mode, encoded digital data DB having a transmission rate of, for example, 30Mb/s are obtained based on the digital data Db in the SP operation mode, and encoded digital data DC having a transmission rate of, for example, 60Mb/s are obtained based on the digital data Dc in the HD operation mode. Accordingly, the encoded digital data DA, DB and DC formed respectively based on the digital data Da, Db and Dc to have the respective transmission rates which satisfy a relation of ratio represented with 1:2:4 are selectively derived from the encoder 17 in accordance with each of the LP, SP and HD operation modes.

The encoded digital data DA, DB or DC thus obtained from the encoder 17 are supplied to a time base processor 19. The time base processor 19 is supplied selectively with the first, second and third mode designating signals Ca, Cb and Cc and operative to cause the encoded digital data DA, DB or DC to be subjected to time base conversion so as to produce modified digital data having a predetermined transmission rate based on the encoded digital data DA, DB or Dc. The time base conversion for each of the encoded digital data DA, DB and DC is carried out in such a manner as described below in conjunction with FIGS. 2A to 2C.

In the case of the LP operation mode wherein the first mode designating signal Ca is sent out from the mode designating signal generator 9, as shown in FIG. 2A, successive data segments a1, a2, a3, a4, a5,—of the encoded digital data DA having the transmission rate of 15Mb/s, each of which is divided to be in a period of time of Th corresponding to one complete turn of each of the rotary magnetic heads Ha, Hb, Hc and Hd, are converted in time base in such a manner that each of alternate data segments a1, a3, a5,—is compressed in time base to have a transmission rate of 30Mb/s and delayed by a period of time corresponding to 3Th/2 so as to form an arrangement of segmented digital data a1', a3', a5',—appearing every 2Th, and each of another alternate data segments a2, a4,—is compressed in time base to have a transmission rate of 30Mb/s and delayed by a period of time corresponding to Th/2 so as to form an arrangement of segmented digital data a2', a4',—appearing every 2Th. The arrangement of segmented digital data a1', a3', a5',—is derived from the time base processor 19 as first modified digital data $D_1$ having the transmission rate 30Mb/s, and the arrangement of segmented digital data a2', a4',—appearing simultaneously with the arrangement of segmented digital data a1', a3', a5',—is also derived from the time base processor 19 as second modified digital data $D_2$ having the transmission rate 30Mb/s.

In the case of the SP operation mode wherein the second mode designating signal Cb is sent out from the mode designating signal generator 9, as shown in FIG. 2B, successive data segments b1, b2, b3, b4,—b10,—of the encoded digital data DB having the transmission rate of 30Mb/s, each of which is divided to be in a period of time corresponding to Th/2, are converted in time base in such a manner that each of alternate data segments b1, b3, b5,—is delayed by a period of time corresponding to 3Th/2 so as to form an arrangement of segmented digital data b1', b3', b5',—appearing every Th, and each of another alternate data segments b2, b4,—is remains to form an arrangement of segmented digital data b2', b4',—appearing every Th. The arrangement of segmented digital data b1', b3', b5',—is derived from the time base processor 19 as first modified digital data $D_1$ having the transmission rate 30Mb/s, and the arrangement of segmented digital data b2', b4',—appearing simultaneously with the arrangement of segmented digital data b1', b3', b5',—is also derived from the time base processor 19 as second modified digital data $D_2$ having the transmission rate 30Mb/s.

Further, in the case of the HD operation mode wherein the third mode designating signal Cc is sent out from the mode designating signal generator 9, as shown in FIG. 2C, successive data segments c1, c2, c3, c4,—c20,—the encoded digital data DC having the transmission rate of 60Mb/s, each of which is divided to be in a period of time corresponding to Th/2, are converted in time base in such a manner that each of alternate data segments c1, c3,—is expanded in time base to have a transmission rate of 30Mb/s and delayed by a period of time corresponding to Th/2 so as to form an arrangement of segmented digital data c1', c3',—appearing continuously and each of another alternate data segments c2, c4,—is expanded in time base to have a transmission rate of 30Mb/s and delayed by a period of time corresponding to Th/4 so as to form an arrangement of segmented digital data c2', c4',—appearing continuously. The arrangement of segmented digital data c1', c3',—is derived from the time base processor 19 as first modified digital data $D_1$ having the transmission rate 30Mb/s, and the arrangement of segmented digital data c2', c4',—appearinght simultaneously with the arrangement of segmented digital data c1', c3',—is also derived from the time base processor 19 as second modified digital data $D_2$ having the transmission rate 30Mb/s.

The first and second modified digital data $D_1$ and $D_2$ which are derived from the time base processor 19 as described above in each of the LP, SP and HD operation modes are supplied to recording modulators 21 and 23, respectively, and modulated signal $SD_1$ and $SD_2$ are produced based on the first and second modified digital data $D_1$ and $D_2$ in the recording modulators 21 and 23. The modulated signals $SD_1$ and $SD_2$ are amplified by recording amplifiers 25 and 27, respectively, and then supplied, through an operation selecting switch 31 which is controlled, at that time, to have movable contacts connected to respective fixed contacts R in accordance with a switch control signal Cs applied to a terminal 33, to the rotary magnetic heads Ha and Hb as recording signals SDa and SDb, respectively, and to the rotary magnetic heads Hc and Hd as recording signals SDc and SDd, respectively.

On that occasion, the capstan driver 7 is supplied selectively with the first, second and third mode designating signals Ca, Cb and CC and operative to drive the capstan 3 so as to transport the magnetic tape TP at a predetermined speed of Vt in response to the first mode designating signal Ca in the LP operation mode, to transport the magnetic tape TP at a predetermined speed of 2Vt in response to the second mode designating signal Cb in the SP operation mode, to transport the magnetic tape TP at a predetermined speed of 4Vt in response to the third mode designating signal Cc in the HD operation mode. The predetermined speeds Vt, 2Vt and 4Vt satisfy the relation of rate represented with 1:2:4 in the same manner as the transmission rates of the encoded digital data DA, DB and DC obtained respectively in the LP, SP and HD operation modes.

Each of the rotary magnetic heads Ha, Hb, Hc and Hd is rotated at the predetermined constant speed with a rotational period of Th by the head driver 1 to scan the magnetic tape TP with a predetermined inclination for a period of time almost corresponding to Th/2 for forming oblique record tracks on the magnetic tape TP, in each of which the recording signals SDa, SDb, SDc and SDd are recorded. The recording of the recording signals SDa, SDb, SDc and SDd on the magnetic tape TP is carried out with the oblique record tracks formed as shown in FIGS. 3A, 3B and 3C.

In the LP operation mode, each of the recording signals SDa and SDc corresponds to the first modified digital data $D_1$ as shown in FIG. 2A and each of the recording signals SDb and SDd corresponds to the second modified digital data $D_2$ as shown in FIG. 2A. Then, in every other scanning periods Tsa each corresponding substantially to Th/2, in which the rotary magnetic heads Ha and Hb close to each other scan the magnetic tape TP, portions of the recording signal SDa corresponding respectively to the segmented digital data a2', a4',—which forms the first modified digital data $D_1$ are supplied to the rotary magnetic head Ha and simultaneously portions of the recording signal SDb corresponding respectively to the segmented digital data a1', a3',—which forms the second modified digital data $D_2$ are supplied to the rotary magnetic head Hb.

Consequently, as shown in FIG. 3A, in one of the scanning periods Tsa in which the rotary magnetic heads Ha and Hb scan the magnetic tape TP in the direction indicated with an arrow Rh, the portion of the recording signal SDa corresponding to the segmented digital data a2' forming the first modified digital data $D_1$ and the portion of the recording signal SDb corresponding to the segmented digital data a1' forming the second modified digital data $D_2$ are recorded simultaneously by the rotary magnetic heads Ha and Hb on the magnetic tape TP to form oblique record tracks $t_n$ and $t_{n+1}$. On that occasion, the portion of the recording signal SDc corresponding to the segmented digital data a2' forming the first modified digital data $D_1$ and the portion of the recording signal SDd corresponding to the segmented digital data a1' forming the second modified digital data $D_2$ are supplied to the rotary magnetic heads Hc and Hd. However, since the rotary magnetic heads Hc and Hd are positioned not to scan the magnetic tape TP, the recording by the rotary magnetic heads Hc and Hd is not carried out.

Then, in each of a scanning period Tsb succeeding to the scanning period Tsa and corresponding substantially to Th/2, in which the rotary magnetic heads Hc and Hd scan the magnetic tape TP in the direction indicated with the arrow Rh, and successive two scanning periods Tsa and Tsb coming after each of the rotary magnetic heads Ha and Hb has started next one turn, the recording signals SDc and SDd and the recording signals SDa and SDb have their empty portions, and therefore the oblique record track is not formed on the magnetic tape TP. Further, in the scanning period Tsa coming after each of the rotary magnetic heads Ha and Hb has started further next one turn, the portion of the recording signal SDa corresponding to the segmented digital data a4' forming the first modified digital data $D_1$ and the portion of the recording signal SDb corresponding to the segmented digital data a3' forming the second modified digital data $D_2$ are recorded simultaneously by the rotary magnetic heads Ha and Hb on the magnetic tape TP to form oblique record tracks $t_{n+2}$ and $t_{n+3}$ in the same manner as the oblique record tracks $t_n$ and $t_{n+1}$.

Under such a condition, the speed Vt at which the magnetic tape TP is transported is so selected that the magnetic tape TP is moved, in the direction indicated with an arrow Rt in FIG. 3A, by a distance Tt corresponding to a space between two successive oblique record tracks during each one turn of each of the rotary magnetic heads Ha, Hb, Hc and Hd. Accordingly, the oblique record tracks $t_{n+2}$ and $t_{n+3}$ are positioned on the magnetic tape TP to be next to the oblique record tracks $t_n$ and $t_{n+1}$.

After that, the portion of the recording signal SDa corresponding to the segmented digital data forming the first modified digital data $D_1$ and the portion of the recording signal SDb corresponding to the segmented digital data forming the second modified digital data $D_2$ are recorded simultaneously on the magnetic tape TP to form oblique record tracks $t_{n+4}$ and $t_{n+5}$ and each two oblique record tracks succeeding thereto at every other turn of the rotary magnetic heads Ha and Hb.

Through such recording operation, the encoded digital data DA obtained from the encoder 17 to have the transmission rate of 15Mb/s are converted to the first and second modified digital data $D_1$ and $D_2$ having the transmission rate of 30Mb/s and then recorded in the oblique record tracks on the magnetic tape TP.

In the SP operation mode, each of the recording signals SDa and SDc corresponds to the first modified digital data $D_1$ as shown in FIG. 2B and each of the recording signals SDb and SDd corresponds to the second modified digital data $D_2$ as shown in FIG. 2B. Then, in each scanning period Tsa in which the rotary magnetic heads Ha and Hb scan the magnetic tape TP, portions of the recording signal SDa corresponding respectively to the segmented digital data b2', b4',— which forms the first modified digital data $D_1$ are supplied to the rotary magnetic head Ha and simultaneously portions of the recording signal SDb corresponding respectively to the segmented digital data b1′, b3′,—which forms the second modified digital data $D_2$ are supplied to the rotary magnetic head Hb.

Consequently, as shown in FIG. 3B, in one of the scanning periods Tsa in which the rotary magnetic heads Ha and Hb scan the magnetic tape TP in the direction indicated with an arrow Rh, the portion of the recording signal SDa corresponding to the segmented digital data b2′ forming the first modified digital data $D_1$ and the portion of the recording signal SDb corresponding to the segmented digital data b1′ forming the second modified digital data $D_2$ are recorded simultaneously by the rotary magnetic heads Ha and Hb on the magnetic tape TP to form oblique record tracks $t_n$ and $t_{n+1}$. On that occasion, the portion of the recording signal SDc corresponding to the segmented digital data b2′ forming the first modified digital data $D_1$ and the portion of the recording signal SDd corresponding to the segmented digital data b1′ forming the second modified digital data $D_2$ are supplied to the rotary magnetic heads Hc and Hd. However, since the rotary magnetic heads Hc and Hd are positioned not to scan the magnetic tape TP, the recording by the rotary magnetic heads Hc and Hd is not carried out.

Then, in a scanning period Tsb succeeding to the scanning period Tsa and corresponding substantially to Th/2, in which the rotary magnetic heads Hc and Hd scan the magnetic tape TP in the direction indicated with the arrow Rh, the recording signals SDc and SDd have their empty portions and therefore the oblique record track is not formed on the magnetic tape TP. Further, in the scanning period Tsa coming after each of the rotary magnetic heads Ha and Hb has started next one turn, the portion of the recording signal SDa corresponding to the segmented digital data b4′ forming the first modified digital data $D_1$ and the portion of the recording signal SDb corresponding to the segmented digital data b3′ forming the second modified digital data $D_2$ are recorded simultaneously by the rotary magnetic heads Ha and Hb on the magnetic tape TP to form oblique record tracks $t_{n+2}$ and $t_{n+3}$ in the same manner as the oblique record tracks $t_n$ and $t_{n+1}$.

Under such a condition, the magnetic tape TP is transported at the speed 2Vt and therefore moved in the direction indicated with an arrow Rt in FIG. 3B by a distance 2Tt corresponding to two times as long as a space between two successive oblique record tracks during each one turn of each of the rotary magnetic heads Ha, Hb, Hc and Hd. Accordingly, the oblique record tracks $t_{n+2}$ and $t_{n+3}$ are positioned on the magnetic tape TP to be next to the oblique record tracks $t_n$ and $t_{n+1}$.

After that, the portion of the recording signal SDa corresponding to the segmented digital data forming the first modified digital data $D_1$ and the portion of the recording signal SDb corresponding to the segmented digital data forming the second modified digital data $D_2$ are recorded simultaneously on the magnetic tape TP to form oblique record tracks $t_{n+4}$ and $t_{n+5}$ and each two oblique record tracks succeeding thereto at every turn of the rotary magnetic heads Ha and Hb.

Through such recording operation, the encoded digital data DB obtained from the encoder 17 to have the transmission rate of 30Mb/s are converted to the first and second modified digital data $D_1$ and $D_2$ having the transmission rate of 30Mb/s and then recorded in the oblique record tracks on the magnetic tape TP.

In the HD operation mode, each of the recording signals SDa and SDc corresponds to the first modified digital data $D_1$ as shown in FIG. 2C and each of the recording signals SDb and SDd corresponds to the second modified digital data $D_2$ as shown in FIG. 2C. Then, in each scanning period Tsa in which the rotary magnetic heads Ha and Hb scan the magnetic tape TP, portions of the recording signal SDa corresponding respectively to alternate ones of the segmented digital data c2′, c4′, c6′, c8′,—C18′,—which form the first modified digital data $D_1$, that is, the segmented digital data c2′, c6′,—, are supplied to the rotary magnetic head Ha and simultaneously portions of the recording signal SDb corresponding respectively to alternate ones of the segmented digital data c1′, c3′, c5′, c7′,—C17′,—which form the second modified digital data $D_2$, that is, the segmented digital data c1′, c5′,—, are supplied to the rotary magnetic head Hb. Further, in each scanning period Tsb in which the rotary magnetic heads Hc and Hd scan the magnetic tape TP, portions of the recording signal SDc corresponding respectively to another alternate ones of the segmented digital data c2′, c4′, c6′, c8′,—C18′,—which form the first modified digital data $D_1$, that is, the segmented digital data c4′, c8′,—, are supplied to the rotary magnetic head Hc and simultaneously portions of the recording signal SDd corresponding respectively to another alternate ones of the segmented digital data c1′, c3′, c5′, c7′,—C17′,—which form the second modified digital data $D_2$, that is, the segmented digital data c3′, c7′,—, are supplied to the rotary magnetic head Hd.

Consequently, as shown in FIG. 3C, in one of the scanning periods Tsa in which the rotary magnetic heads Ha and Hb scan the magnetic tape TP in the direction indicated with an arrow Rh, the portion of the recording signal SDa corresponding to the segmented digital data c2′ forming the first modified digital data $D_1$ and the portion of the recording signal SDb corresponding to the segmented digital data c1′ forming the second modified digital data $D_2$ are recorded simultaneously by the rotary magnetic heads Ha and Hb on the magnetic tape TP to form oblique record tracks $t_n$ and $t_{n+1}$. Next, in the scanning period Tsb succeeding to the scanning period Tsa, in which the rotary magnetic heads Hc and Hd scan the magnetic tape TP in the direction indicated with the arrow Rh, the portion of the recording signal SDc corresponding to the segmented digital data c4′ forming the first modified digital data $D_1$ and the portion of the recording signal SDd corresponding to the segmented digital data c3′ forming the second modified digital data $D_2$ are recorded simultaneously by the rotary magnetic heads Hc and Hd on the magnetic tape TP to form oblique record tracks $t_{n+2}$ and $t_{n+3}$.

Then, in the scanning period Tsa coming after each of the rotary magnetic heads Ha, Hb, Hc and Hd has started next one turn, the portion of the recording signal SDa corresponding to the segmented digital data c6′ forming the first modified digital data $D_1$ and the portion of the recording signal SDb corresponding to the segmented digital data c5′ forming the second modified digital data $D_2$ are recorded simultaneously by the rotary magnetic heads Ha and Hb on the magnetic tape TP to form oblique record tracks $t_{n+4}$ and $t_{n+5}$ in the same manner as the oblique record tracks $t_n$ and $t_{n+1}$. Further, in the scanning period Tsb succeeding to the scanning period Tsa during the next turn of each of the rotary magnetic heads Ha, Hb, Hc and Hd, the portion of the recording signal SDc corresponding to the segmented digital data c8' forming the first modified digital data $D_1$ and the portion of the recording signal SDd corresponding to the segmented digital data c7' forming the second modified digital data $D_2$ are recorded simultaneously by the rotary magnetic heads Ha and Hb on the magnetic tape TP to form oblique record tracks $t_{n+4}$ and $t_{n+5}$.

Under such a condition, the magnetic tape TP is transported at the speed 4Vt and therefore moved in the direction indicated with an arrow Rt in FIG. 3C by a distance 4Tt corresponding to four times as long as a space between two successive oblique record tracks during each one turn of each of the rotary magnetic heads Ha, Hb, Hc and Hd. Accordingly, the oblique record tracks $t_{n-tn+5}$—are positioned on the magnetic tape TP to be arranged successively.

After that, the portion of the recording signal SDa corresponding to the segmented digital data forming the first modified digital data $D_1$, the portion of the recording signal SDb corresponding to the segmented digital data forming the second modified digital data $D_2$, the portion of the recording signal SDc corresponding to the segmented digital data forming the first modified digital data $D_1$, and the portion of the recording signal SDd corresponding to the segmented digital data forming the second modified digital data $D_2$ are recorded simultaneously on the magnetic tape TP to form four oblique record tracks at every turn of the rotary magnetic heads Ha, Hb, Hc and Hd.

Through such recording operation, the encoded digital data DC obtained from the encoder 17 to have the transmission rate of 60Mb/s are converted to the first and second modified digital data $D_1$ and $D_2$ having the transmission rate of 30Mb/s and then recorded in the oblique record tracks on the magnetic tape TP.

In the reproducing section of the recording and reproducing system shown in FIG. 1, the recording signals SDa and SDb, or SDa, SDb, SDc and SDd which are recorded in the oblique record tracks $t_n$—$t_{n+5}$—formed on the magnetic tape TP as described above are reproduced by the rotary magnetic heads Ha and Hb or Ha, Hb, Hc and Hd and the color television signal $S_N$ or $S_H$ is reproduced based on the recording signals SDa and SDb or SDa, SDb, SDc and SDd obtained from the magnetic tape TP under the condition where the LP, SP or HD operation mode is taken.

In the reproduction of the recording signals SDa and SDb or SDa, SDb, SDc and SDd from the magnetic tape TP conducted by the rotary magnetic heads Ha and Hb or Ha, Hb, Hc and Hd, the capstan 3 is driven by the capstan driver 7 to which the first, second and third mode designating signals are selectively supplied from the mode designating signal generator 9, and the magnetic tape TP on which the recording signals SDa and SDb or SDa, SDb, SDc and SDd are recorded is transported by the capstan 3 at the speed Vt in the LP operation mode, at the speed 2Vt in the SP operation mode, and at the speed 4Vt in the HD operation mode. Further, each of the rotary magnetic heads Ha, Hb, Hc and Hd is rotated at the predetermined constant speed with a rotational period of Th by the head driver 1 to scan the oblique record tracks $t_n$—$t_{n+5}$—on the magnetic tape TP running at the speed Vt, 2Vt or 4Vt.

In more detail, in the case of the LP operation mode, each two successive oblique record tracks on the magnetic tape TP which runs at the speed Vt are scanned by the rotary magnetic heads Ha and Hb at every other turn of each of the rotary magnetic heads Ha, Hb, Hc and Hd, and thereby the recording signals SDa and SDb are reproduced simultaneously for a period of time corresponding to Th/2 from each two successive oblique record tracks. The recording signals SDa and SDb thus reproduced are of contents corresponding respectively to the first and second modified digital data $D_1$ and $D_2$ shown in FIG. 2A.

In the case of the SP operation mode, each two successive oblique record tracks on the magnetic tape TP which runs at the speed 2Vt are scanned by the rotary magnetic heads Ha and Hb at every other turn of each of the rotary magnetic heads Ha, Hb, Hc and Hd, and thereby the recording signals SDa and SDb are reproduced simultaneously for a period of time corresponding to Th/2 from each two successive oblique record tracks. The recording signals SDa and SDb thus reproduced are of contents corresponding respectively to the first and second modified digital data $D_1$ and $D_2$ shown in FIG. 2B.

Further, in the case of the HD operation mode, two successive oblique record tracks on the magnetic tape TP which runs at the speed 4Vt are scanned simultaneously by the rotary magnetic heads Ha and Hb and then next two successive oblique record tracks on the magnetic tape TP running at the speed 4Vt are scanned simultaneously by the rotary magnetic heads Hc and Hd at every other turn of each of the rotary magnetic heads Ha, Hb, Hc and Hd, and thereby each of the recording signals SDa and SDb, SDc and SDd are reproduced for a period of time corresponding to Th/2 from each four successive oblique record tracks. Each of the recording signals SDa and SDc reproduced through the rotary magnetic heads Ha and Hc respectively is of contents corresponding to the first modified digital data $D_1$ shown in FIG. 2C and each of the recording signals SDb and SDd reproduced through the rotary magnetic heads Hb and Hd respectively is of contents corresponding to the second modified digital data $D_2$ shown in FIG. 2C.

The recording signals SDa, SDb, SDc and SDd obtained from the rotary magnetic heads Ha, Hb, Hc and Hd respectively supplied through the operation selecting switch 31 which is controlled, at that time, to have the movable contacts connected to respective fixed contacts P in accordance with the switch control signal Cs applied to the terminal 33, to reproducing amplifiers 41, 43, 45 and 47, respectively. The recording signals SDa and SDc amplified by the reproducing amplifiers 41 and 43 respectively are supplied through an adder 49 to a reproduced signal detector 53 and the modulated signal $SD_1$ is detected by the reproduced signal detector 53. Similarly, the recording signals SDb and SDd amplified by the reproducing amplifiers 45 and 47 respectively are supplied through an adder 51 to a reproduced signal detector 55 and the second modulated signal $SD_2$ is detected by the reproduced signal detector 55.

The modulated signal $SD_1$ obtained from the reproduced signal detector 53 is demodulated at a reproducing demodulator 57 to produce the first modified digital data $D_1$ and the modulated signal $SD_2$ obtained from the reproduced signal detector 55 is demodulated at a reproducing demodulator 59 to produce the second modified digital data $D_2$. The first and second modified digital data $D_1$ and $D_2$ are composed of the segmented digital data a2', a4',—having the transmission rate of 30Mb/s as shown in FIG. 2A and the segmented digital data a1', a3',—having the transmission rate of 30Mb/s as shown in FIG. 2A in the LP operation mode, of the segmented digital data b2', b4',—b10'—having the transmission rate of 30Mb/s as shown in FIG. 2B and the segmented digital data b1', b3', —b10'—having the transmission rate of 30Mb/s as shown in FIG. 2B in the SP operation mode, and of the segmented digital data c2', c4', b6'—c18'—having the transmission rate of 30Mb/s as shown in FIG. 2C and the segmented digital data c1', c3', c5',—c17'—having the transmission rate of 30Mb/s as shown in FIG. 2B in the HD operation mode, and supplied to a time base processor 61.

The time base processor 61 is supplied selectively with the first, second and third mode designating signals Ca, Cb and Cc and operative to cause the first and second modified digital data $D_1$ and $D_2$ to be subjected to time base conversion so as to produce the encoded digital data DA, DB or DC having the predetermined transmission rate. The time base conversion for the first and second modified digital data $D_1$ and $D_2$ is carried out in such a manner as described below.

In the case of the LP operation mode wherein the first mode designating signal Ca is sent out from the mode designating signal generator 9, each of the segmented digital data a1', a3',—having the transmission rate of 30Mb/s and constituting the second modified digital data $D_2$ is expanded in time base to have a transmission rate of 15Mb/s and each of the segmented digital data a2', a4',—having the transmission rate of 30Mb/s and constituting the modified digital data $D_1$ is expanded in time base to have the transmission rate of 15Mb/s and delayed by a period of time corresponding to Th, so that the encoded digital data DA having the transmission rate of 15Mb/s as shown in FIG. 2A are formed in the time base processor 61 and derived therefrom.

In the case of the SP operation mode wherein the second mode designating signal Cb is sent out from the mode designating signal generator 9, each of the segmented digital data b1', b3',—b9',—having the transmission rate of 30Mb/s and constituting the second modified digital data $D_2$ is taken out as it is and each of the segmented digital data b2', b4',—b10' having the transmission rate of 30Mb/s and constituting the first modified digital data $D_1$ is delayed by a period of time corresponding to Th/2, so that the encoded digital data DB having the transmission rate of 30Mb/s as shown in FIG. 2B are formed in the time base processor 61 and derived therefrom.

Further, in the case of the HD operation mode wherein the third mode designating signal Cc is sent out from the mode designating signal generator 9, each of the segmented digital data c1', c3', c5',—c17',—having the transmission rate of 30Mb/s and constituting the second modified digital data $D_2$ is compressed in time base to have a transmission rate of 60Mb/s and each of the segmented digital data c2', c4', c6',—c18',—having the transmission rate of 30Mb/s and constituting the first modified digital data $D_1$ is compressed in time base to have the transmission rate of 60Mb/s and delayed by a period of time corresponding to Th/4, so that the encoded digital data DC having the transmission rate of 60Mb/s as shown in FIG. 2C are formed in the time base processor 61 and derived therefrom.

The encoded digital data DA, DB or DC obtained from the time base processor 61 as described above are supplied to a decoder 63. The decoder 63 is supplied selectively with the first, second and third mode designating signals Ca, Cb and Cc and operative to cause the encoded digital data DA, DB or DC to be subjected to decoding in response to the first, second or third mode designating signal Ca, Cb or Cc, so as to produce decoded digital data. With this decoder 63, the digital data Da having the transmission rate of 15Mb/s are obtained based on the encoded digital data DA in the LP operation mode, the digital data Db having the transmission rate of 30Mb/s are obtained based on the encoded digital data DB in the SP operation mode, and the digital data Dc having the transmission rate of 60Mb/s are obtained based on the encoded digital data DC in the HD operation mode.

The digital data Da, Db or Dc obtained from the decoder 63 are supplied to a bit restoration circuit 65. The bit restoration circuit 65 is supplied selectively with the first, second and third mode designating signals Ca, Cb and Cc and operative to cause the digital data Da, Db or Dc to be subjected to bit restoration in one of different manners corresponding respectively to the first, second and third mode designating signals Ca, Cb and Cc so as to convert the digital data Da, Db or Dc to the digital data $D_N$ or $D_H$. With this bit restoration circuit 65, the digital data $D_N$ is obtained based on the digital data Da in the LP operation mode, the digital data $D_N$ is obtained based on the digital data Db in the SP operation mode, and the digital data $D_H$ is obtained based on the digital data Dc in the HD operation mode. The digital data $D_N$ or $D_H$ obtained from the bit restoration circuit 65 is supplied to a digital to analog (D-A) converter 67.

The D-A converter 67 is supplied selectively with the first, second and third mode designating signals Ca, Cb and Cc and operative to carry out a D-A converting operation in different manners respectively in the case where the digital data $D_N$ is supplied thereto and in the case where the digital data $D_H$ is supplied thereto. Consequently, in the LP or SP operation mode, the digital data $D_N$ is converted to the color television signal $S_N$ according to the NTSC system to be derived from an output terminal 69, and in the HD operation mode, the digital data $D_H$ is converted to the color television signal $S_H$ according to the HDTV system to be derived from the output terminal 69.

As described above, with the reproducing section of the recording and reproducing apparatus shown in FIG. 1, the color television signal $S_N$ is reproduced based on the encoded digital data DA having the transmission rate of 15Mb/s which are obtained by causing the first and second modified digital data $D_1$ and $D_2$ having the transmission rate of 30Mb/s and reproduced from the magnetic tape TP to be subjected to the time base conversion in the case of the LP operation mode, the color television signal $S_N$ is reproduced based on the encoded digital data DB having the transmission rate of 30Mb/s which are obtained by causing the first and second modified digital data $D_1$ and $D_2$ having the transmission rate of 30Mb/s and reproduced from the magnetic tape TP to be subjected to the time base conversion in the case of the SP operation mode, and the color television signal $S_H$ is reproduced based on the encoded digital data DC having the transmission rate of 60Mb/s which are obtained by causing the first and second modified digital data $D_1$ and $D_2$ having the transmission rate of 30Mb/s and reproduced from the magnetic tape TP to be subjected to the time base conversion in the case of the HD operation mode.

What is claimed is:

1. A magnetic recording apparatus comprising:
   an input terminal to which an information signal is applied;
   encoding means for encoding the information signal supplied from the input terminal to one of plural kinds of digital data which have different transmission rates respectively;
   time base processing means for selectively converting a time base of the digital data obtained from said encoding means so as to produce modified digital data having a predetermined transmission rate;
   modulating means for producing a recording signal corresponding to the modified digital data obtained from said time base processing means;
   recording means provided with a rotary magnetic head device to which said recording signal is supplied and tape guiding means for guiding a magnetic tape on which said recording signal is to be recorded and operative to cause said rotary magnetic head device to contact with the magnetic tape for forming oblique record tracks on the magnetic tape;
   head driving means for rotating said rotary magnetic head device at a predetermined speed of rotation; and
   tape driving means for causing the magnetic tape to run at a speed corresponding to the transmission rate of the encoded digital data obtained from said encoding means.

2. A magnetic recording apparatus according to claim 1, wherein said different transmission rates satisfy a predetermined relation of ratio.

3. A magnetic recording apparatus according to claim 1, wherein said different transmission rates correspond to different operation modes respectively.

4. A magnetic recording apparatus according to claim 1, wherein said rotary magnetic head device comprises a head cylinder on which the magnetic tape is wound with a predetermined wrapping angle and at least a pair of rotary magnetic heads disposed to face each other with the center of the head cylinder.

5. A magnetic recording apparatus according to claim 4, wherein said time base processing means is operative to produce first and second modified digital data each having said predetermined transmission rate based on the encoded digital data obtained from said encoding means, and said modulating means is operative to produce first and second recording signals which correspond respectively to the first and second modified digital data and are supplied to said pair of rotary magnetic heads, respectively.

6. A magnetic recording apparatus according to claim 1, wherein said rotary magnetic head device comprises a head cylinder on which the magnetic tape is wound with a predetermined wrapping angle, a first pair of rotary magnetic heads close to each other, and a second pair of rotary magnetic heads close to each other, said first pair of rotary magnetic heads and second pair of rotary magnetic heads being disposed to face each other with the center of the head cylinder.

7. A magnetic recording apparatus according to claim 5, wherein said time base processing means is operative to produce first and second modified digital data each having said predetermined transmission rate based on the encoded digital data obtained from said encoding means, and said modulating means is operative to produce first and second recording signals corresponding respectively to the first and second modified digital data, said first recording signal being supplied to both one of said first pair of rotary magnetic heads and one of said second pair of rotary magnetic heads, and said second recording signal being supplied to both the other of said first pair of rotary magnetic heads and the other of said second pair of rotary magnetic heads.

8. A magnetic recording apparatus according to claim 1, wherein said encoding means includes comprising analog to digital converting means for converting the information signal supplied from said input terminal to digital data, and bit reduction means for causing the digital data obtained from said analog to digital converting means to be subjected to bit reduction so as to produce digital data which are encoded to be said encoded digital data.

9. A magnetic reproducing apparatus comprising:
   reproducing means provided with a rotary magnetic head device and tape guide means for guiding a magnetic tape on which a recording signal obtained based on digital data having a predetermined transmission rate is recorded in each of oblique record tracks and operative to cause the rotary magnetic head device to contact with the magnetic tape for scanning the oblique record tracks to reproduce the recording signal from the magnetic tape;
   head driving means for rotating said rotary magnetic head device at a predetermined speed of rotation;
   tape driving means for causing the magnetic tape to run at a speed selected from a plurality of predetermined speeds satisfying a predetermined relation of ratio;
   demodulating means for reproducing the digital data based on the recording signal reproduced by said rotary magnetic head device;
   time base processing means for causing the digital data obtained from said demodulating means to be subjected to time base conversion so as to produce modified digital data having a predetermined transmission rate selected correspondingly to the selected speed of the magnetic tape; and
   decoding means for producing, based on the modified digital data obtained from said time base processing means, reproduced digital data representing an information signal.

10. A magnetic reproducing apparatus according to claim 9, wherein said rotary magnetic head device comprises a head cylinder on which the magnetic tape is wound with a predetermined wrapping angle and at least a pair of rotary magnetic heads disposed to face each other with the center of the head cylinder and operative to reproduce first and second recording signals from the magnetic tape, respectively.

11. A magnetic reproducing apparatus according to claim 9, wherein said demodulating means is operative to reproduce first and second digital data based on said first and second recording signals respectively, and said time base processing means is operative to produce said modified digital data based on both of the first and second digital data obtained from said demodulating means.

12. A magnetic reproducing apparatus according to claim 9, wherein said rotary magnetic head device comprises a head cylinder on which the magnetic tape is wound with a predetermined wrapping angle, a first pair of rotary magnetic heads close to each other, and a second pair of rotary magnetic heads close to each other, said first pair of rotary magnetic heads and second pair of rotary magnetic heads being disposed to face each other with the center of the head cylinder and operative to reproduce first to fourth recording signals from the magnetic tape, respectively.

13. A magnetic reproducing apparatus according to claim 12, wherein said demodulating means is operative to reproduce first and second digital data based on said first to fourth recording signals, and said time base processing means is operative to produce said modified digital data based on both of the first and second digital data obtained from said demodulating means.

14. A magnetic reproducing apparatus according to claim 9 further comprising bit restoration means for causing the digital data obtained from said decoding means to be subjected to bit restoration so as to produce restored digital data, and digital to analog converting means for converting the restored digital data obtained from said bit restoration means to the information signal.

15. A magnetic recording and reproducing apparatus comprising:

an input terminal to which an information signal is applied;

encoding means for encoding the information signal supplied from the input terminal to one of plural kinds of digital data which have different transmission rates respectively;

first time base processing means for selectively converting a time base of the digital data obtained from said encoding means so as to produce modified digital data having a predetermined transmission rate;

modulating means for producing a recording signal corresponding to the modified digital data obtained from said first time base processing means;

recording and reproducing means provided with a rotary magnetic head device and tape guiding means for guiding a magnetic tape on which the recording signal is to be recorded and operative to cause said rotary magnetic head device to contact with the magnetic tape for forming oblique record tracks on the magnetic tape and scanning oblique record tracks formed on the magnetic tape;

head driving means for rotating said rotary magnetic head device at a predetermined speed of rotation;

tape driving means for causing the magnetic tape to run at a predetermined speed corresponding to the transmission rate of the encoded digital data obtained from said encoding means, demodulating means for reproducing the modified digital data based on the recording signal reproduced by said rotary magnetic head device from the magnetic tape;

second time base processing means for selectively converting a time base of the modified digital data obtained from said demodulating means so as to produce the encoded digital data having the predetermined transmission rate; and decoding means for decoding said encoded digital data obtained from said second time base processing to digital data representing the information signal.

16. A magnetic recording apparatus according to claim 15, wherein said different transmission rates satisfy a predetermined relation of ratio.

17. A magnetic recording apparatus according to claim 15, wherein said different transmission rates correspond to different operation modes respectively.

* * * * *